United States Patent
Nagumo et al.

(10) Patent No.: US 8,100,385 B2
(45) Date of Patent: Jan. 24, 2012

(54) HUMIDIFIER

(75) Inventors: Kenji Nagumo, Saitama (JP);
Toshikatsu Katagiri, Saitama (JP);
Yohei Hidaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 968 days.

(21) Appl. No.: 12/059,686

(22) Filed: Mar. 31, 2008

(65) Prior Publication Data
US 2008/0237902 A1 Oct. 2, 2008

(30) Foreign Application Priority Data

Mar. 30, 2007 (JP) ................................. 2007-095476

(51) Int. Cl.
*B01F 3/04* (2006.01)
*B01D 63/02* (2006.01)
*H01M 8/04* (2006.01)

(52) U.S. Cl. ............... 261/102; 261/104; 96/8; 429/413
(58) Field of Classification Search .................. 261/101, 261/102, 104, 105, 107; 95/52; 96/8; 55/509; 429/413

See application file for complete search history.

(56) References Cited

U.S. PATENT DOCUMENTS

| | | | | |
|---|---|---|---|---|
| 3,339,341 A | * | 9/1967 | Murdock et al. | ............... 95/53 |
| 4,666,469 A | * | 5/1987 | Krueger et al. | ............... 95/54 |
| 5,149,340 A | * | 9/1992 | Waycuilis | ............... 95/49 |
| 6,669,177 B2 | * | 12/2003 | Shimanuki et al. | ............. 261/96 |
| 6,755,399 B2 | * | 6/2004 | Shimanuki et al. | ............. 261/104 |
| 7,094,348 B2 | * | 8/2006 | Sunohara et al. | ......... 210/321.88 |
| 7,906,241 B2 | * | 3/2011 | Kusano et al. | ................ 429/413 |
| 2006/0147774 A1 | * | 7/2006 | Suzuki et al. | ................... 429/26 |
| 2007/0065696 A1 | * | 3/2007 | Fukuma et al. | ................. 429/26 |
| 2008/0152977 A1 | * | 6/2008 | Kusano et al. | ................... 429/26 |

FOREIGN PATENT DOCUMENTS

| JP | 2004-006099 A | 1/2004 |
|---|---|---|
| JP | 2004-006100 A | 1/2004 |

OTHER PUBLICATIONS

Japanese Office Action dated Aug. 9, 2011, issued in corresponding Japanese Patent Applicatiion No. 2007-095476.

* cited by examiner

*Primary Examiner* — Frank Lawrence, Jr.
(74) *Attorney, Agent, or Firm* — Westerman, Hattori, Daniels & Adrian, LLP

(57) ABSTRACT

In a humidifier including a hollow fiber membrane bundle housed in a case, the hollow fiber membranes exchange water therethrough between the first and second gases flowing inside and outside the hollow fiber membrane to humidify one of the first and second gases having the water content lower than the other, and an annular mesh member throttles a part near the gas outlet of the second gas to provide a space between the part and the gas outlet of the second gas to easily discharge the second gas.

9 Claims, 7 Drawing Sheets

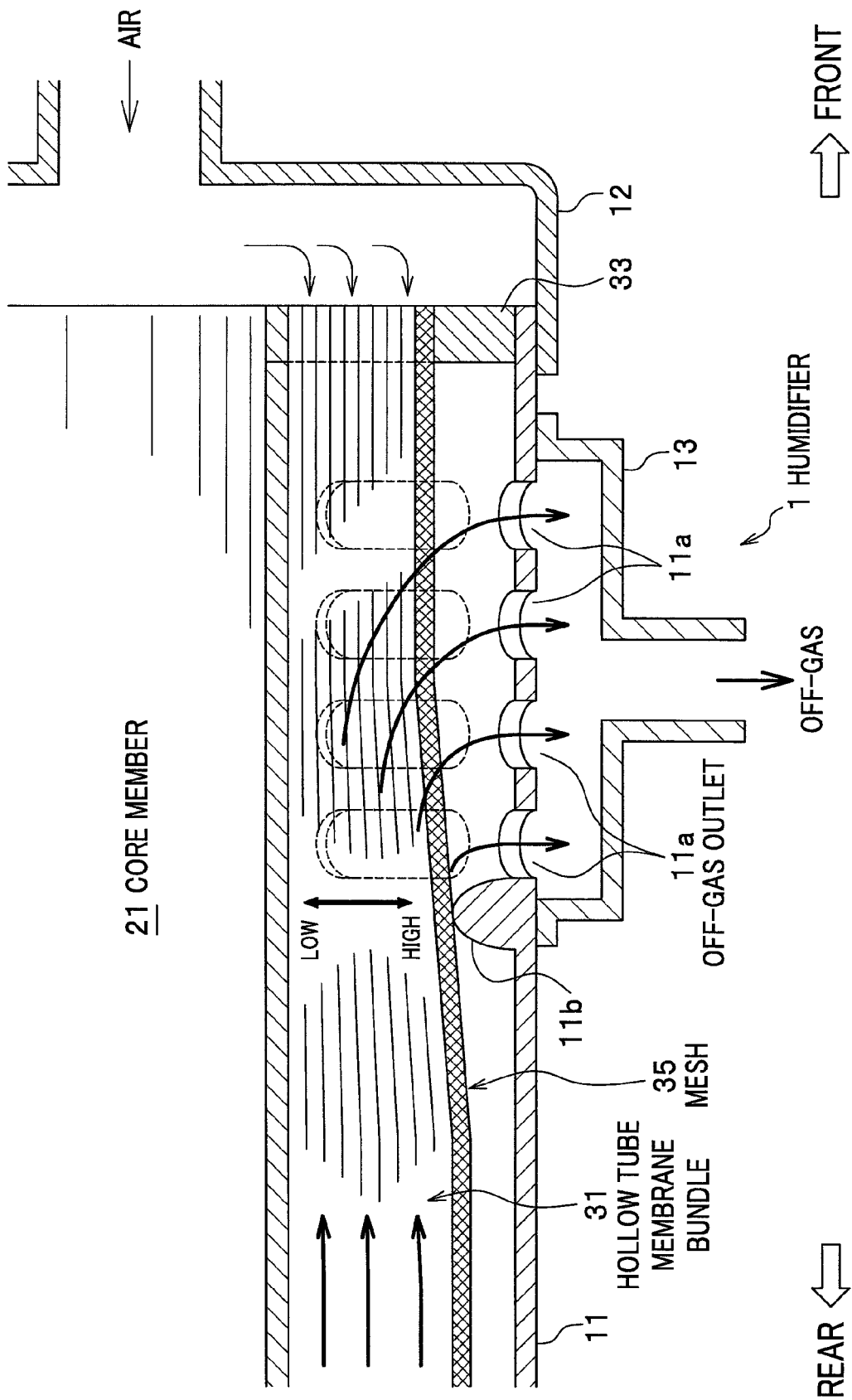

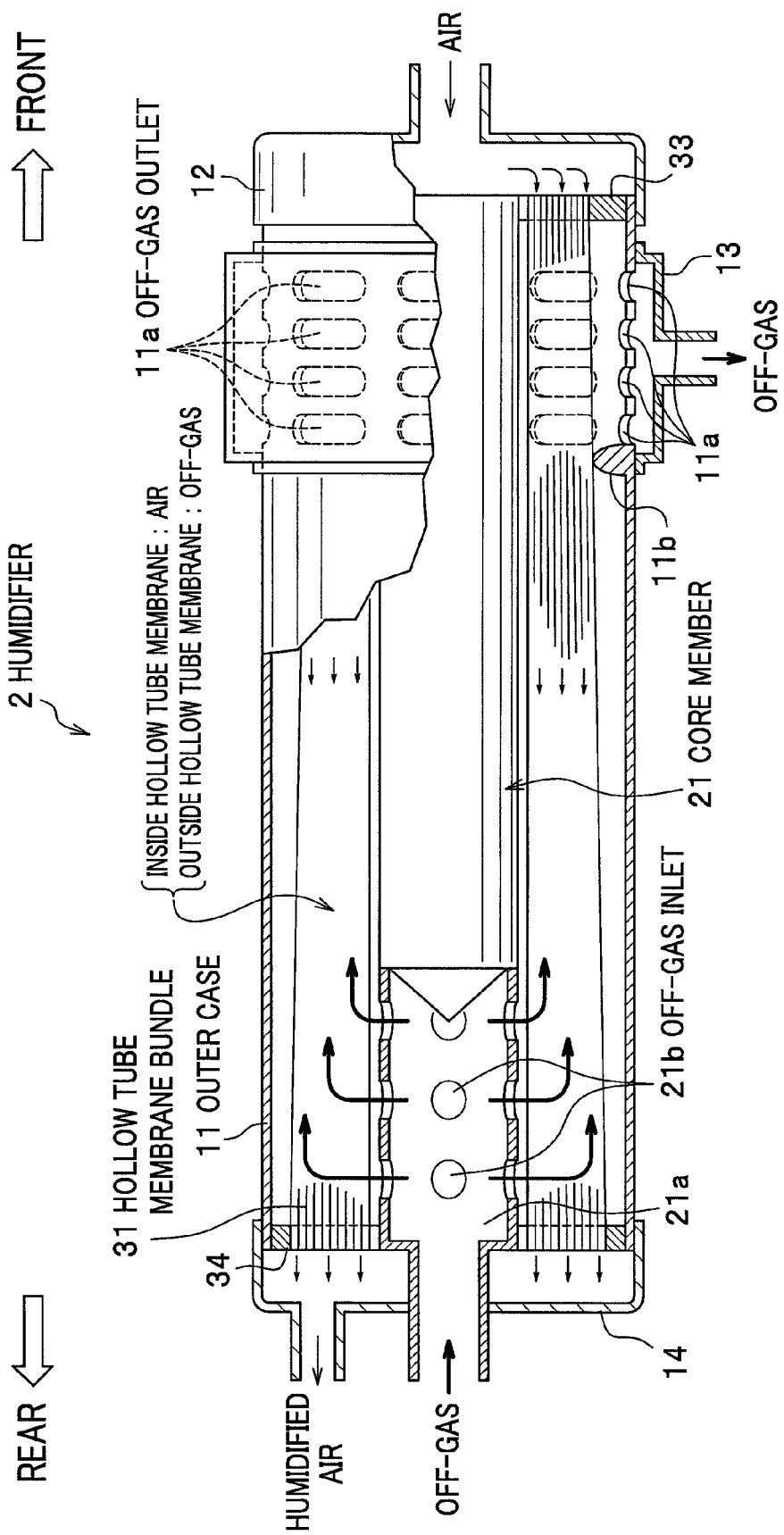

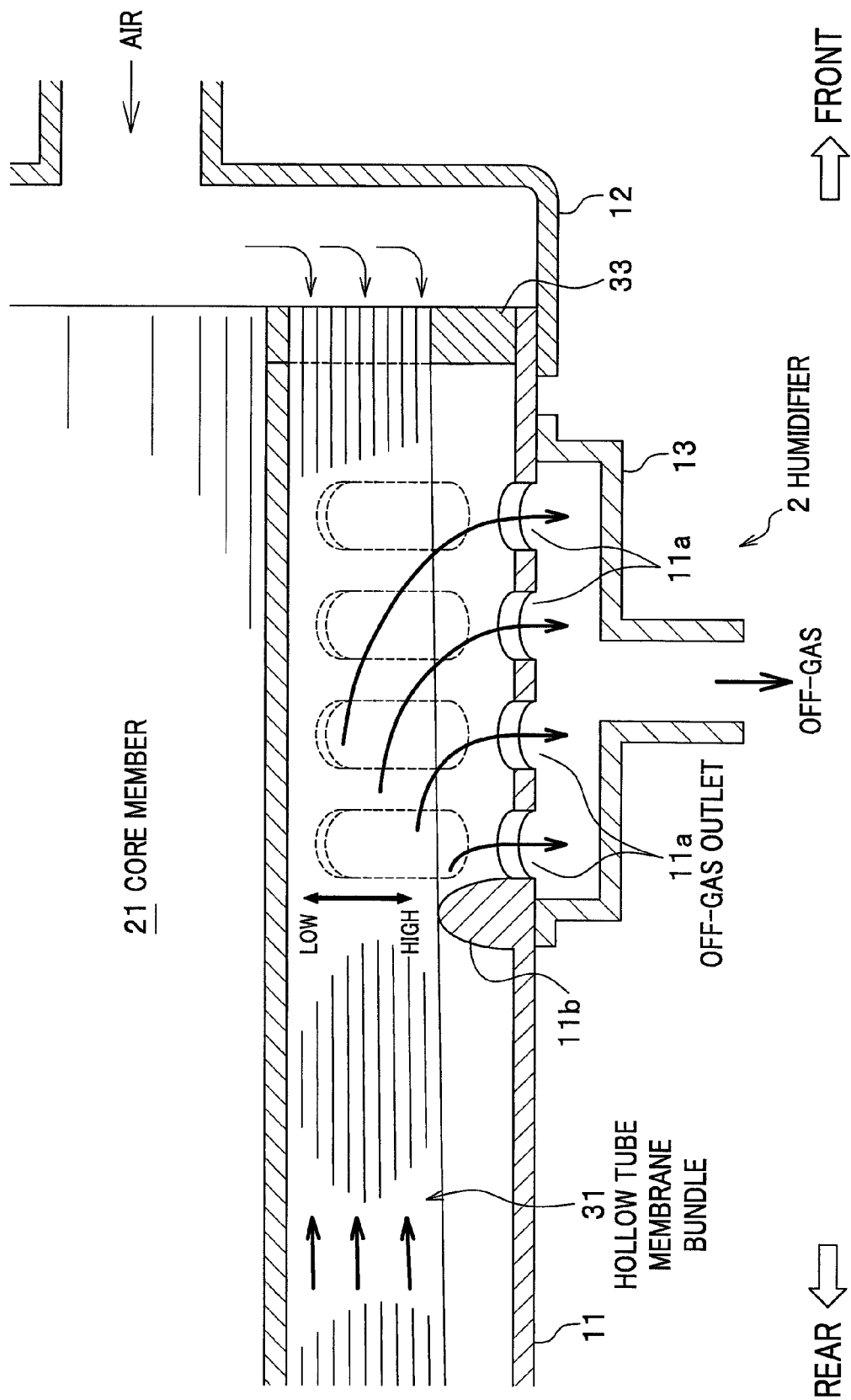

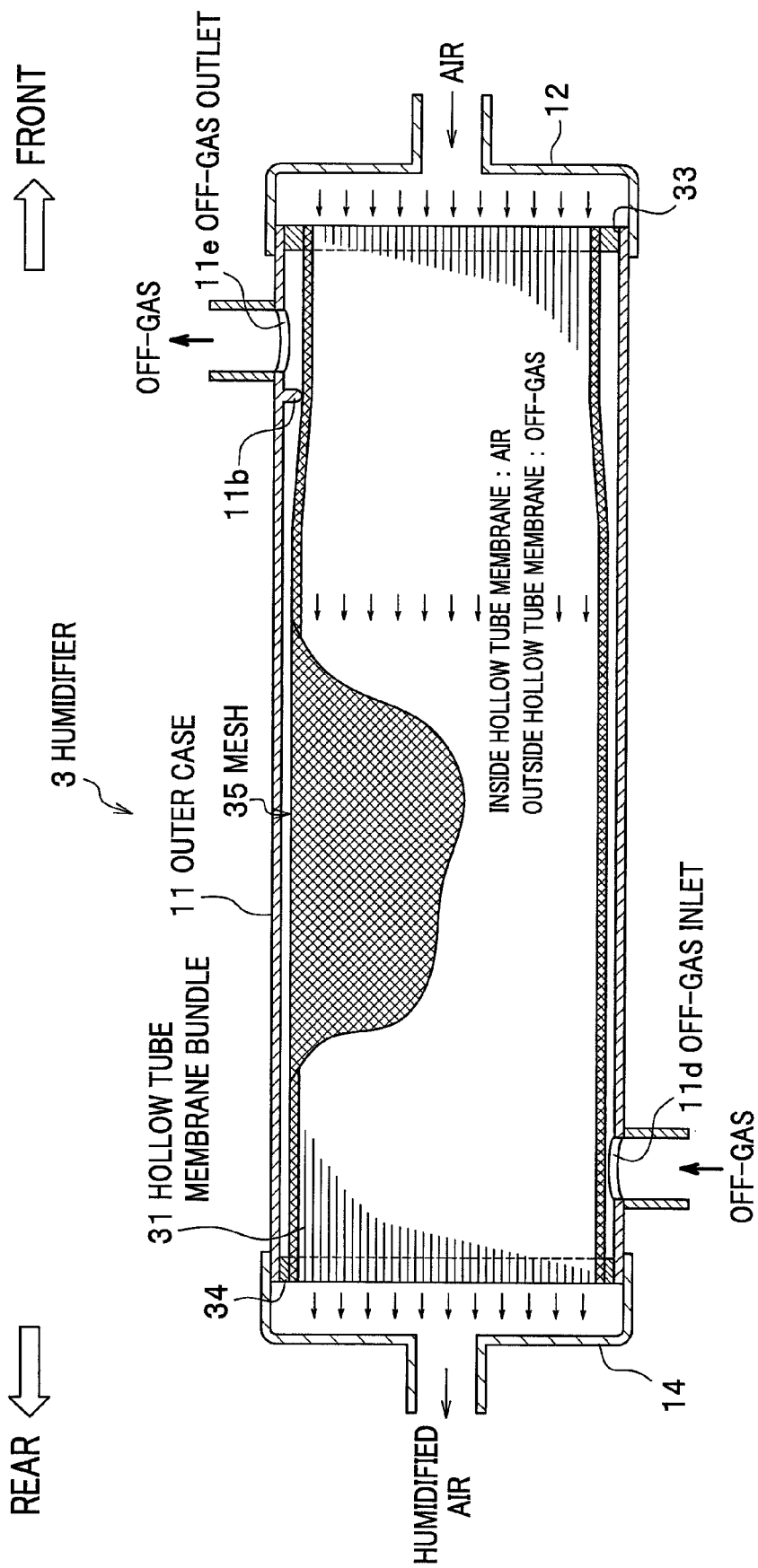

HUMIDIFIER

CROSS REFERENCE TO RELATED APPLICATIONS

This application claims the foreign priority benefit under Title 35, United States Code, §119(a)-(d) of Japanese Patent Application No. 2007-095476, filed on Mar. 30, 2007 in the Japan Patent Office, the disclosure of which is herein incorporated by reference in its entirety.

BACKGROUND OF THE INVENTION

1. Field of the Invention

The present invention relates to a humidifier for humidifying a gas to be supplied to an apparatus such as a fuel cell, and particularly to a humidifier including hollow fiber membranes having a water permeability in walls thereof.

2. Description of the Related Art

Fuel cells such as Polymer Electrolyte Fuel Cells (PEFC) require a humidifier for humidifying a fuel gas such as hydrogen and oxidant gas such as oxide.

JP2004-6099A discloses, in FIG. 11 thereof, a humidifier including hollow fiber membranes having a water permeability in wall thereof housed in a case for humidifying air through exchanging water by the hollow fiber membranes between an much moist off-gas (having much water) exhausted from a fuel cell and air (oxidant gas) supplied to the fuel cell.

However, in the humidifier disclosed in JP2004-6099A, the hollow fiber membranes may stick to an inner circumferential surface of the case, closing gas outlets due to a flow of the gas, while the gas flows outside the hollow fiber membranes and is discharged through the gas outlets in the case. Once a part of the gas outlets is closed as mentioned above, a dischargeability of the gas flowing outside the hollow fiber membranes decreases. Accordingly, a flow rate of the gas in the humidifier and the fuel cell decreases. As a result, the fuel cell system may adversely operate.

Further, if the gas outlets are closed, a pressure loss of the gas flowing outside the hollow fiber membranes is disturbed. Thus, exchange of water cannot be efficiently provided, resulting in an unfavorable humidification.

SUMMARY OF THE INVENTION

A first aspect of the present invention provides a humidifier comprising: a hollow fiber membrane bundle including a plurality of hollow fiber membranes; a case that houses the hollow fiber membrane bundle and has a gas outlet, wherein a first gas having a water content different from a second gas flows inside the hollow fiber membranes, and the second gas flows outside the hollow fiber membranes and is discharged to the external through the gas outlet, wherein the hollow fiber membranes exchange the water therethrough between the first and second gases to humidify one of the first and second gases having the water content lower than the other; and an annular mesh member that covers a part of the hollow fiber membrane bundle near the gas outlet to throttle the part to provide a space between the part and the gas outlet.

In this structure, preferably, the annular mesh member covering the part of the hollow fiber membrane bundle near the gas outlet of the second gas throttles the part to provide a space between the part and the gas outlet of the second gas. In other words, preferably, the mesh member covers an outer surface at the part near the gas outlet of the second gas at least, so that distances (gaps) between hollow fiber membranes are shortened at the part near the gas outlet of the second gas and thus a density of the hollow fiber membranes becomes higher in a cross-sectional direction of the hollow fiber membranes.

In the humidifier, preferably, the annular mesh member covers and throttles at least the part of the hollow fiber bundle near the gas outlet of the second gas to provide the space between the part near the gas outlet of the second gas and the gas outlet of the second gas to prevent the hollow fiber membranes forming the hollow fiber bundle from closing the gas outlet of the second gas. Thus, preferably, the second gas is discharged from the gas outlet of the second gas which flows outside the hollow fiber membranes within the case, securing a flowability of the second gas. Preferably, this suppresses the disturbance in a pressure loss of the second gas within the case, so that water exchange is efficiently made between the first and second gases to humidify the gas.

Further, because the mesh may have an air permeability, if the mesh covers the outer circumferential surface of the hollow fiber membrane bundle, preferably, decrease in the flowability of the second gas is prevented both outside and inside the hollow fiber membranes.

Further, preferably, covering the hollow fiber bundle with the annular mesh prevents the hollow fiber membranes forming the hollow fiber bundle from being disjoined and protects the outer circumferential surface of the hollow fiber membrane bundle. Further, in assembling the humidifier, preferably, covering the hollow fiber membranes with the mesh facilitates handling the hollow fiber membranes.

A second aspect of the present invention provides a humidifier comprising: a hollow fiber membrane bundle including a plurality of hollow fiber membranes; a case that houses the hollow fiber membrane bundle and has a gas outlet, wherein a first gas, having a water content different from a water content of a second gas, flows inside the hollow fiber membranes, and the second gas flows outside the hollow fiber membranes and is discharged to the external through the gas outlet, wherein the hollow fiber membranes exchange the water therethrough between the first and second gases to humidify one of the first and second gases having the water content lower than the other; and a fixing part fixing the hollow fiber membrane bundle to the case at a part of the hollow fiber membrane bundle near the gas outlet to provide a space between the part and the gas outlet.

In the humidifier, preferably, the hollow fiber membrane bundle is fixed to the case through the fixing part so as to throttle the part of the hollow fiber bundle near the gas outlet of the second gas to provide the space between the part near the gas outlet of the second gas and the gas outlet of the second gas to prevent the hollow fiber membranes forming the hollow fiber bundle from closing the gas outlet of the second gas. Thus, preferably, the second gas is discharged from the gas outlet of the second gas which flows outside the hollow fiber membranes within the case, securing a flowability of the second gas. Preferably, this suppresses disturbance in a pressure loss of the second gas within the case, so that the water exchange is efficiently made between the first and second gases to humidify the gas.

A third aspect provides a humidifier based on the first aspect, wherein the gas outlet of the second gas comprises a plurality of openings in the case arranged in an axial direction of the case, and areas of the openings increases in a flowing direction of the second gas.

In the humidifier, because areas of the openings may increase in a flowing direction of the second gas, preferably, the pressure loss of the second gas caused by the gas outlets of the second gas decreases in the flow direction of the second gas.

Preferably, this allows the second gas to be easily discharged through the gas outlets arranged more downstream. Thus, preferably, a part of the hollow fiber membranes located more downstream also provides the water exchange.

BRIEF DESCRIPTION OF THE DRAWINGS

The object and features of the present invention will become more readily apparent from the following detailed description taken in conjunction with the accompanying drawings in which:

FIG. 4 is an enlarged cross-sectional view of a main part of the humidifier according to the embodiment;

FIG. 5 is a side cross-sectional view of the humidifier according to a modification of the present invention;

FIG. 6 is an enlarged cross-sectional view of a main part of the humidifier according to the modification; and FIG. 7 is a side cross-sectional view of the humidifier according to another modification of the present invention.

The same or corresponding elements or parts are designated with like references throughout the drawings.

DETAILED DESCRIPTION OF THE INVENTION

The present invention provides a humidifier which can efficiently perform water exchange between gasses to humidify one of the gases by the other gas, in which gas flowability is secured.

With reference to FIGS. 1 to 4, will be described an embodiment.

Figure 1:
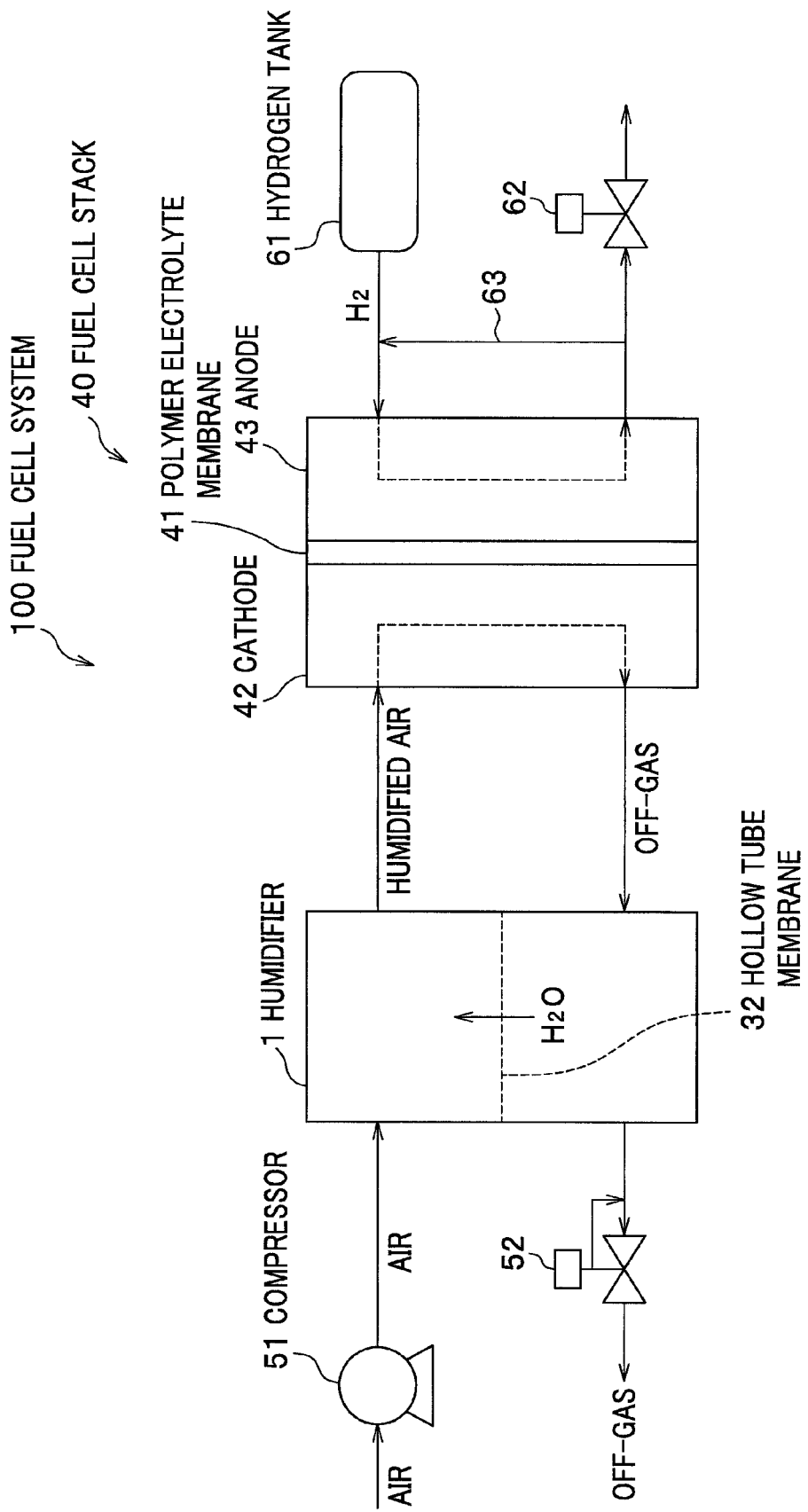
FIG. 1 is a block diagram of a fuel cell system including a humidifier according to an embodiment of the present invention.

First, will be described a fuel cell system including a humidifier according to the embodiment of the present invention with reference to FIG. 1. A fuel cell system 100 shown in FIG. 1 is installed in a fuel cell vehicle (not shown). The fuel cell system 100 includes a fuel cell stack 40, a compressor 51 for supplying air (oxidant gas) containing oxygen, a humidifier 1 including therein hollow fiber membranes 32 for appropriately humidifying the air supplied to the fuel cell stack 40, and a hydrogen tank 61 (hydrogen supplying device) for supplying hydrogen (fuel gas) to the fuel stack 40.

The fuel cell stack 40 is of Polymer Electrolyte Fuel Cells (PEFC) including a plurality of single cells piled one another, each of single cells includes a MEA (Membrane Electrode Assembly) sandwiched by separators. The MEA includes a polymer electrolyte membrane 41 and a cathode 42 and an anode 43, in which the polymer electrolyte membrane 41 is sandwiched by the cathode 41 and the anode 43.

The cathode 42 is supplied with a humidified air. In other words, the humidified air is provided by the humidifier 1 which humidifies the air from the compressor 51. The anode 43 is supplied with hydrogen from the hydrogen tank 61.

When the hydrogen and the humidified air are supplied, an electrochemical reaction occurs on catalysts (not shown) included in the cathode 42 and the anode 43, so that the fuel cell stack 40 generates an electric power. Output terminals (not shown) of the fuel cell stack 40 are connected to an electric motor (not shown) for travailing a fuel cell vehicle (not shown), which drives the fuel cell vehicle with the electric power from the fuel cell stack 40. A part downstream from the cathode 42 of the fuel cell stack 40 is connected to the humidifier 1 through a tube which supplies the air (hereinafter referred to as off-gas) including water (moisture) generated at the cathode 42 by an electrochemical reaction accompanied by the electric power generation. The hollow fiber membrane 32 in the humidifier 1 provides water exchange, which decrease a water content in the off-gas which is exhausted to the atmospheric air through the back pressure regulation valve 52.

On the other hand, a part downstream from the anode 43 of the fuel cell stack 40 is opened to the atmospheric air through a purge valve 62 to discharge the anode off-gas containing hydrogen exhausted from the anode which has not react into the atmospheric air. A tube between the anode 43 and the purge valve 62 is connected to a tube between the anode 43 and the hydrogen tank 61 with a circulation tube 63. When a concentration of impurity in the anode off-gas is low, i.e., when a hydrogen concentration in the anode off-gas is high, the purge valve 62 is closed to return the anode off-gas to the hydrogen supplying side.

<<Structure of Humidifier>>

Figure 2:
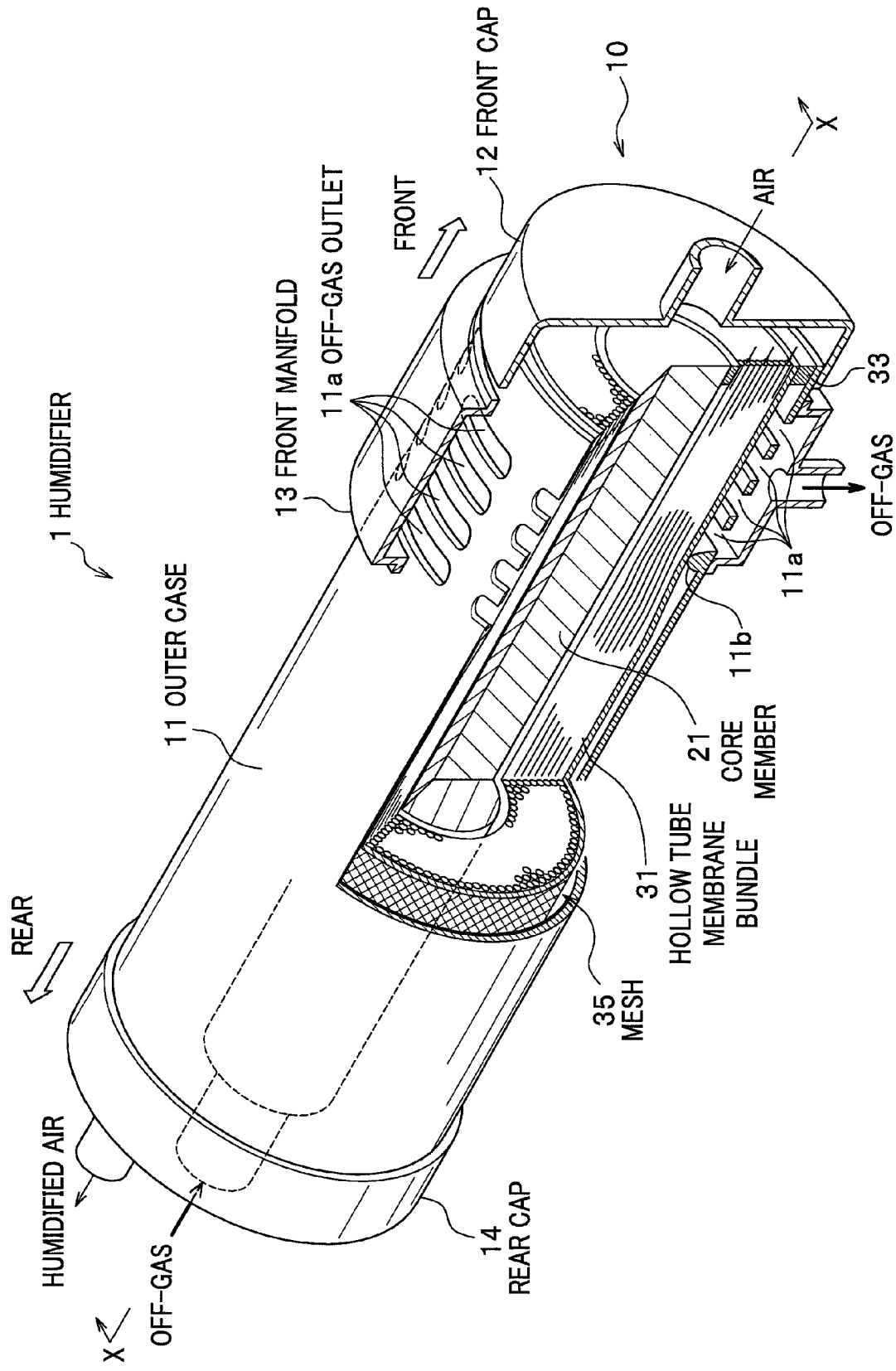
FIG. 2 is a perspective view, partially a cutaway view, of the humidifier of the embodiment.
Figure 3:
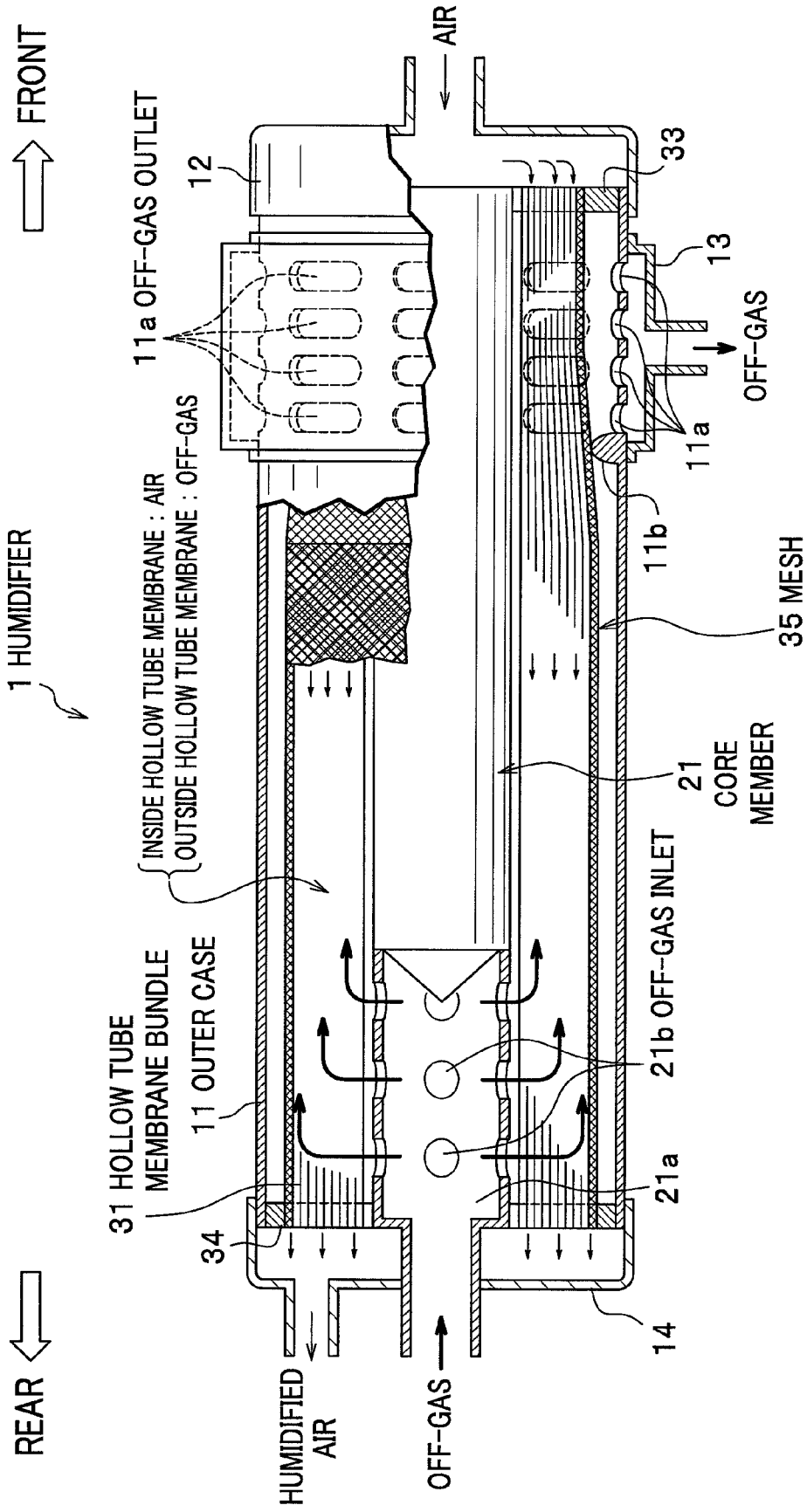
FIG. 3 is a side cross-sectional view, taken along a line X-X, of the humidifier according to the embodiment.

With reference to FIGS. 2 to 4 will be described the humidifier 1.

As shown in FIG. 2, the humidifier has an exterior of approximately a cylinder. The air (a first gas) from the compressor 51 is introduced into an inside of the humidifier 1 from a front side with respect to an axial direction of the humidifier 1 and exhausted from a rear side of the humidifier 1. The term "front" or "front side" means a side on which the air is supplied, and the term "rear" or "rear side" means a side on which the off-gas is supplied (see FIG. 2), throughout the specification. However, this does not limit the arrangement of the humidifier in the fuel cell vehicle (not shown) or the like. The off gas (second gas) having a high water content from the cathode 42 is introduced into the inside of the humidifier 1 from the rear side of the humidifier 1 in which the water content is decreased by water exchange, and exhausted through a circumferential surface on the front side of an outer case 11.

As shown in FIGS. 2 and 3, the humidifier 1 includes a case 10 of a sleeve, a core member 21 arranged on a center axis of the case 10, a hollow fiber membrane bundle 31 housed in the case 10 and packed between the case 10 and the core member 21, a mesh (mesh member) 35 of an annulus (sleeve) for covering the hollow fiber membrane bundle 31, and potting parts 33 and 34 (fixing parts or sealing parts) for fixing the hollow fiber membrane bundle 31 and the mesh 35 to the case 10. In other words, in view in a cross section, the core member 21 is inside the hollow fiber membrane 31 having an annular shape and arranged on a center axis of the case 10 and the hollow fiber membrane bundle 31.

<Case and Core Member>

The case 10 includes an outer case 11, a front cap 12, a front manifold 13, and a rear cap 14.

The outer case 11 is a sleeve member made of a hard plastic such as PC (polycarbonate) and PPO (polyphenylene oxide) and has a plurality of off-gas outlets 11a (outlets of the second gas) on a circumferential wall on a front side thereof for allowing the off-gas after the water exchange to flow out. Openings of the off-gas outlets 11a extend in a circumferential direction of the outer case 11 and are arranged in an axial direction thereof (flowing direction of the off-gas), i.e., in this embodiment, four off-gas outlets 11a are arranged in the axial direction.

Further, preferably, an area of each off-gas outlets 11a is made larger as the off-gas advances in a flowing direction thereof. As mentioned above the closer to the potting part 33 the off-gas outlet 11a is, the larger the area of the off-gas outlet 11*a* becomes. This reduces a pressure loss that the off-gas encounters at each of off-gas outlets 11*a*, so that the off-gas can be easily discharged from the off-gas outlets 11*a* on a side of the potting part 33 also. This structure allows the off-gas to readily flow into the hollow fiber membrane bundle 31 near the potting part 33, which provides the water exchange also through the hollow fiber membranes 32 of a part of the hollow fiber membrane bundle 31 near the potting part 33.

Further, on an inner circumferential surface near the off-gas outlets 11*a* in the outer case 11, an annular bank 11*b* (protrusion ridge) protruding from the inner circumferential surface in a radially inward direction (see FIG. 4). The bank 11*b* pushes the mesh 35 covering an outer circumferential surface of the hollow fiber membrane bundle 31 in the radially inward direction.

For example, the annular bank 11*b* can be formed as follows:

In molding the outer case 11, an insertion set for forming the hollow part of the outer case 11 is made to be divided at a corresponding portion of the annular bank 11*b* as well as outer surfaces corresponding to the annular bank 11*b* are formed on the divided insertions. Then, the annular bank 11*b* is formed by pulling out the two insertions from the outer case 11 forward or rearward.

The front cap 12 is attached to the outer case 11 so as to shut a front opening of the outer case 11. The air is introduced from the compressor 51 into an inside of the front cap and further introduced therefrom into each of hollow fiber membranes 32.

The front manifold 13 is a cover for collecting the off-gas flowing from a plurality of the off-gas outlets 11*a* to the external. The front manifold 13 has an annular hollow part therein and attached to the outer case 11 so as to cover the off-gas outlets 11*a* extending in the circumferential direction and arranged in the axial direction. The off-gas after the water exchange is discharged from the off-gas outlets 11*a* to the external through the annular hollow part.

The rear cap 14 is attached to the outer case 11 so as to shut an opening of the outer case 11 on a rear side thereof. A humidified air flowing from the hollow fiber membranes 32 is discharged to the external through an inner space of the rear cap 14.

<Core Member>

The core member 21 has a cylindrical hollow part 21*a* at a rear part thereof into which the off-gas is introduced (see FIG. 3). The core member 21 has a plurality of off-gas inlets 21*b* (inlets of the second gas) formed in a wall around the hollow part 21*a* of the core member 21 to allow the off-gas introduced into the hollow part 21*a* to flow into the hollow fiber membrane bundle 31 outside the core member 21.

<Hollow Fiber Membrane Bundle>

The hollow fiber membrane bundle 31 is formed with a predetermined number (for example, 10 to 10,000) of hollow fiber membranes 32 made of polyimide and the like bundled. The hollow fiber membrane bundle 31 is filled in a space between the outer case 11 and the core member 21 as well as fixed to the outer case 11 and the core member 21 through the potting part 33 on the front side and through the potting part 34 (fixing part) on the rear side. Thus, the humidifier 1 has a water exchange part for exchanging water extending in an axial direction thereof between the potting parts 33 and 44.

Further, the front opening (inlets of the first gas) of the hollow fiber membranes 32 are communicated with the inside of the front cap 12 which allows the air to flow into the hollow fiber membranes 32. On the other hand, the rear opening (outlets of the first gas) of the hollow fiber membranes 31 is communicated with the inside of the rear cap 14 to allow the humidified air to flow into the inside of the rear cap from the hollow fiber membranes 32.

The hollow fiber membrane 32 is a thin tube having an outer diameter equal to or less than 3 mm (preferably, 0.2 to 1 mm) of which circumferential wall has a plurality of minute through holes having a diameter of nanometers. The air (first gas) with a low water content is allowed to flow through the insides of the hollow fiber membranes 32 and the off-gas (second gas) with a high water content is allowed to flow outside the hollow fiber membranes 32. Then water in the off-gas with the high water content is sucked and penetrates the circumferential wall of the hollow fiber membrane 32 by the capillary phenomenon to be added to the air having the low water content, so that the air is humidified and discharged as a humidified air. As mentioned above, without using a planner membrane (not shown), but the hollow fiber membranes 32 are used, which markedly increases an efficient area per volume for humidifying.

Further, even if the hollow fiber membrane bundle 31 is throttled by the mesh 35, the hollow fiber membranes 32 cannot be crashed themselves because the hollow fiber membranes 32 are thin and the air, having a high pressure than the off-gas due to compression by the compressor 51, passes through the hollow fiber membranes 32.

<Potting Parts>

The potting parts 33 and 34 are parts for fixing the hollow fiber membrane bundle 31 and the mesh 35 covering the hollow fiber membrane bundle 31 to the outer case 11 and seals the hollow fiber membrane 31 inside the outer case 11. The potting parts 33 and 34 are formed of a thermosetting resin such as epoxy resin.

<Mesh>

The mesh (mesh member) 35 is substantially a sleeve in which a part thereof on the side of the off-gas outlets 11*a* is made to have a smaller diameter than other parts to be tightly in contact with and cover an outer surface of the hollow fiber membrane bundle 31 and throttle at least a part near the off-gas outlet 11*a* in the radially inward direction to separate the part near the off-gas outlets 11*a* of the hollow fiber membrane bundle 31 from the off-gas outlets 11*a* (provide a space between the part near the off-gas outlets 11*a* of the hollow fiber membrane bundle 31 from the off-gas outlets 11*a*). The mesh 35 has an appropriate size of the meshes to allow the off-gas to flow therethrough between the inside and outside of the mesh 35.

The mesh 35 is formed of a material uneasy to be elongated, such as fluoroethylene resin, and PP (polypropylene) base resins. Further, in the embodiment, front and rear ends of the mesh 35 are fixed to the outer case 11 through the potting parts 33 and 34 together with the hollow fiber membrane bundle 31 not to be shifted in the axial direction.

The part near the off-gas outlets 11*a*, which is the front part of the mesh 35 is shrunk in diameter thereof to throttle the part near the off-gas outlets 11*a* of the hollow fiber membrane bundle 31. This prevents the hollow fiber membrane 32 forming the hollow fiber membrane bundle 31 from closing the off-gas outlets 11*a* and sticking to the inner circumferential surface of the outer case 11. Thus, a pressure loss of the off-gas flowing outside the hollow fiber membranes 32 is uneasily to be disturbed, so that the off-gas favorably flows without turbulence flow.

A degree of shrinking in the diameter of the mesh 35 relates to a degree of a distance for separating the hollow fiber membrane bundle 31 from the off-gas outlets 11*a* and can be previously obtained through a test. The mesh 35 is formed on the basis of the result of the test.

Throttling the part of the hollow fiber membrane bundle 31 near the off-gas outlets 11a shortens distances (gaps) between the hollow fiber membranes 32 in a cross-sectional direction of the hollow fiber membrane bundle 31, so that a density of the hollow fiber membranes 31 in the hollow fiber membrane bundle 31 is increased. In other words, the hollow fiber membranes 32 of the part near the off-gas outlets 11a have a higher density than the other part thereof in a cross-section.

Further, the density (rate of packing) of the hollow fiber membranes 32 in the hollow fiber membrane bundle 31 is made higher at a part more outward than a part more inward in the radial direction (see FIG. 4). In other words, gaps between the hollow fiber membranes 32 of the hollow fiber membrane bundle 31 are larger on a center side thereof than those on the outer side. Thus, a cross-sectional area of a flow passage of the off-gas at the part throttled by the mesh 35 is made smaller than that at the other part.

Accordingly, at the part near the off-gas outlets 11a, the off-gas flows mainly on the center side where the gaps are large, which allows the off-gas to flow more easily toward the radially inward side. This further prevents the hollow fiber membranes 32 from closing the off-gas outlets 11a.

Further, because the cross-sectional area of the flow passage at the throttled part is small, if a flow rate is the same therethrough, a speed of the flow of the off-gas is high at the throttled part. This allows the off-gas to more easily flow inside the outer case 11 to a part near the potting part 33 on the front side, which makes the water exchange through the hollow fiber membrane 32 efficient on the front side.

Further, covering the hollow fiber membrane bundle 31 with the mesh 35 as mentioned above prevents the hollow fiber membranes 32 forming the hollow fiber membrane bundle 31 from being disjointed. In addition, in assembling the humidifier 1, covering the hollow fiber membranes 31 with the mesh 35 facilitates handling the hollow fiber membranes 31.

<<Advantageous Effects>>

The humidifier 1 mainly provides the following advantageous effects:

The mesh 35 throttles the part, near the off-gas outlets 11a, of the hollow fiber membrane bundle 31 so that the outer surface of the hollow fiber membrane bundle 31 is separated from the off-gas outlets 11a in the radially inward direction (cross-sectional direction). This prevents the hollow fiber membranes 32 from sticking to an inner surface of the outer case 11, which prevents the off-gas outlets 11a from being closed.

Thus, the off-gas after the water exchange passes through the off-gas outlets 11a and is favorably discharged to the external. In other words, the off-gas from the fuel cell stack 40 is discharged via the humidifier 1 to the external without decrease in a flow rate. Accordingly, the fuel cell system 100 favorably operates.

Further, the density of the hollow fiber membranes 32 packed in the mesh 35 decreases in the radially inward direction, so that the off-gas tends to flow inwardly in the radial direction as well as the flow rate of the off-gas increases. Thus, the hollow fiber membranes 32 at a front part of the hollow fiber membrane bundle 31 can perform the water exchange. This efficiently humidifies the air.

As mentioned above, a preferable embodiment of the present invention has been described. However, the present invention is not limited to the embodiment, but may be modified without departure of the subject of the present invention.

For example, as shown in FIGS. 5 and 6, a humidifier 2 may be provided such that the hollow fiber membrane bundle 31 is fixed to the outer case 11 through the potting parts 33 and 34 so as to throttle the hollow fiber membranes 32 at the part near the off-gas outlets 11a without using mesh 35 to separate this part from the off-gas outlets 11.

The hollow fiber membrane bundle 31 throttled by the potting parts 33 and 34 as mentioned above can be prepared, for example, by that the hollow fiber membrane bundle 31 is temporally fixed with a jig or a band to have a throttled shape and then the potting parts 33 and 34 are formed in a status where the temporally fixed and throttled hollow fiber membrane bundle 31 is arranged at a predetermined position.

In the embodiment, the present invention is applied to the humidifier 1 in which the hollow fiber membrane bundle 31 is packed between the outer case 11 and the core member 21. However, the present invention is not limited to this, but can be applied to a humidifier 3 without the core member 21 including off-gas inlets 11d (inlet of the second gas) on the rear side of the outer case 11 and off-gas outlets lie on the front side (the outlets of the second gas).

In the above-mentioned embodiment, the mesh 35 and the hollow fiber membrane bundle 31 have substantially the same length in the axial direction, and the mesh 35 covers a whole outer circumferential surface of the hollow fiber membrane bundle 31. It may be sufficient only by that the mesh 35 is a longer in the axial direction than the off-gas outlets 11a plurally formed, so that the part near the off-gas outlets 11, of the hollow fiber membrane bundle 31 covers the off-gas outlets 11a and the vicinity and is throttled.

Further, in the above-mentioned embodiment, the mesh 35 having substantially sleeve shape throttles the hollow fiber membrane bundle 31. However, for example, the hollow fiber membrane bundle 31 may be throttled with a belt.

The above-mentioned embodiment shows the case where the first gas (air) passing through the hollow fiber membranes 32 contains an amount of water lower than the second gas (off-gas). However, the first gas contains an amount of water higher than the second gas (off-gas). In other words, the air from the compressor 51 may pass outside the hollow fiber membranes 32.

The above-mentioned embodiment shows the case where the direction of the off-gas (the second gas) flowing outside the hollow fiber membranes 32 is opposite to that of the air flowing inside the hollow fiber membranes. However, the present invention is not limited to this, but the directions may be the same.

The invention claimed is:

1. A humidifier comprising:
a hollow fiber membrane bundle including a plurality of hollow fiber membranes;
a case that houses the hollow fiber membrane bundle and has a gas outlet, wherein a first gas having a water content different from a second gas flows inside the hollow fiber membranes, and the second gas flows outside the hollow fiber membranes and is discharged to the external through the gas outlet, wherein the hollow fiber membranes exchange the water therethrough between the first and second gases to humidify one of the first and second gases having the water content lower than the other; and
an annular mesh member that covers a part of the hollow fiber membrane bundle near the gas outlet to throttle the part to provide a space between the part and the gas outlet.

2. The humidifier as claimed in claim 1, wherein the gas outlet of the second gas comprises a plurality of openings in the case arranged in an axial direction of the case, areas of the openings increases in a flowing direction of the second gas.

3. The humidifier as claimed in claim 1, further comprising an annular bank protruding from an inner surface of the case protruding toward the hollow fiber membrane to inwardly press the hollow tube membrane bundle at upstream of the second gas from the outlet of the second gas.

4. The humidifier as claimed in claim 1, wherein the gas outlet is connected to a cathode of a fuel cell system.

5. A humidifier comprising:
- a hollow fiber membrane bundle including a plurality of hollow fiber membranes;
- a case that houses the hollow fiber membrane bundle and has a gas outlet, wherein a first gas, having a water content different from a water content of a second gas, flows inside the hollow fiber membranes, and the second gas flows outside the hollow fiber membranes and is discharged to the external through the gas outlet, wherein the hollow fiber membranes exchange the water therethrough between the first and second gases to humidify one of the first and second gases having the water content lower than the other; and
- a fixing part fixing the hollow fiber membrane bundle to the case at a portion of the hollow fiber membrane bundle near the gas outlet to provide a space between the portion of the hollow fiber membrane bundle and the gas outlet,
- the gas outlet of the second gas comprises a plurality of openings in the case arranged in an axial direction of the case, and areas of the openings increases in a flowing direction of the second gas.

6. The humidifier as claimed in claim 5, further comprising an annular bank protruding from an inner surface of the case protruding toward the hollow fiber membrane to inwardly press the hollow tube membrane bundle at upstream of the second gas from the outlet of the second gas.

7. The humidifier as claimed in claim 5, wherein the gas outlet is connected to a cathode of a fuel cell system.

8. A humidifier comprising:
- a hollow fiber membrane bundle including a plurality of hollow fiber membranes;
- a case that houses the hollow fiber membrane bundle and has a gas outlet, wherein a first gas, having a water content different from a water content of a second gas, flows inside the hollow fiber membranes, and the second gas flows outside the hollow fiber membranes and is discharged to the external through the gas outlet, and
- an annular bank protruding from an inner surface of the case protruding toward the hollow fiber membrane to inwardly press the hollow tube membrane bundle at upstream of the second gas from the outlet of the second gas, wherein
- the hollow fiber membranes exchange the water therethrough between the first and second gases to humidify one of the first and second gases having the water content lower than the other; and
- a fixing part fixing the hollow fiber membrane bundle to the case at a portion of the hollow fiber membrane bundle near the gas outlet to provide a space between the portion of the hollow fiber membrane bundle and the gas outlet.

9. The humidifier as claimed in claim 8, wherein the gas outlet is connected to a cathode of a fuel cell system.

* * * * *